United States Patent [19]

Allen

[11] 4,109,068

[45] Aug. 22, 1978

[54] RADIATION SENSITIVE VINYL HYDROPHILIC COPOLYMERS

[75] Inventor: John Graham Allen, Runcorn, England

[73] Assignee: Imperial Chemical Industries Limited, London, England

[21] Appl. No.: 720,799

[22] Filed: Sep. 7, 1976

Related U.S. Application Data

[63] Continuation of Ser. No. 518,892, Oct. 29, 1974, abandoned, which is a continuation of Ser. No. 259,607, Jun. 5, 1972, abandoned.

[30] Foreign Application Priority Data

Jun. 9, 1971 [GB] United Kingdom ............... 19668/71

[51] Int. Cl.$^2$ ........................ C08L 23/00; C08L 25/00
[52] U.S. Cl. ........................... 526/9; 204/159.14; 204/159.18; 260/874; 96/115 R; 526/16; 526/50
[58] Field of Search ............... 260/874; 526/9, 16, 526/50; 204/159.14

[56] References Cited

U.S. PATENT DOCUMENTS 3,647,446  3/1972  Alsup et al. ................... 96/35.1

FOREIGN PATENT DOCUMENTS 1,073,332  6/1967  United Kingdom.
1,208,822  3/1968  United Kingdom.

*Primary Examiner*—Richard B. Turer
*Attorney, Agent, or Firm*—Cushman, Darby & Cushman

[57] ABSTRACT

Photosensitive polymeric compositions comprising a copolymer of (a) vinyl alcohol units and (b) vinyl ester units derived from the structure

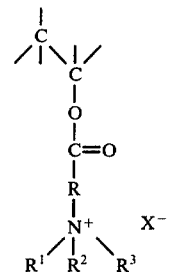

in which R is a divalent organic group, $R^1$, $R^2$ and $R^3$ are organic substituents and X is an anion are disclosed. The ratio of (a) to (b) units is from 1:100 to 1000:1, units (a) and (b) together forming at least 80% of the copolymer. These copolymers are useful in forming films sensitive to ultra-violet radiation.

11 Claims, No Drawings

RADIATION SENSITIVE VINYL HYDROPHILIC COPOLYMERS

This is a continuation of application Ser. No. 518,892 filed Oct. 29, 1974, now abandoned and which was a continuation of Ser. No. 259,607, filed June 5, 1972, now abandoned.

This invention relates to hydrophilic polymers, some of which are photosensitive.

According to our invention there is provided a copolymer or blend of polymers containing (a) vinyl alcohol units and (b) units derived from a vinyl ester of structure I, below, the molar ratio of units (a):(b) being 1 to 100 to 1000 to 1 and the units (a) and (b) forming at least 80% of the blend or copolymer.

Where up to 20% of other units are present there may be other vinyl comonomer units, especially vinyl ester units. For example when a vinyl alcohol polymer is prepared by hydrolysis of polyvinyl acetate, up to 20% of the vinyl ester units may be left unhydrolysed.

Units are defined by the structure I.

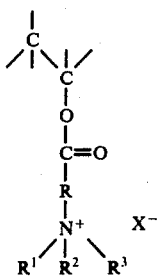

where R is a divalent organic group such as methylene, poly (methylene), arylene e.g. benzyl or aralkylene, $R^{1-3}$ are (same or different) organic substituents such as alkyl (preferably up to 3 carbon) or aryl, e.g. phenyl but are preferably part of a heterocyclic ring system based on the nitrogen atom and $X^-$ is an anion.

If the nitrogen atom of units (b) is part of a heterocyclic ring system which is linked to a second nitrogen-containing heterocyclic ring system by a direct link or by an unsaturated group such that a chain of conjugated unsaturation exists between the two nitrogen atoms, and provided the anion $X^-$ is derived from a strong acid, then the resultant polymer is photosensitive, especially to ultraviolet radiation and to electron beams. Examples of such photosensitive polymers are those in which the nitrogen atom is part of 2,2'-or 4,4'-bipyridilium, 7,7'-diazapyrenium, 2,2'- or 4,4'-biquinolinium, 1,2-dipyridinium ethylene or 4-(4'pyridyl) pyridinium heterocyclic system. One nitrogen atom of such a system is linked to the polymer backbone and the other may be an unconnected tertiary nitrogen atom, or a quaternary nitrogen atom linked to a hydrocarbon group or to another strand of the same polymeric backbone to form cross-links.

Examples of corresponding anions are halides, especially chlorine, alkyl sulphate, bisulphate, tetrafluoroborate, silicofluoride, perchlorate, and fluoride.

Polymers according to our invention may be prepared by quaternisation of vinyl haloacetate units in a copolymer containing vinyl alcohol and vinyl haloacetate units or by similar treatment of a polymer blend containing such units. If, after quaternisation it is desired to replace the particular halide anion formed with another halide or a different (non halide) anion, this can be achieved by anion exchange.

The starting halogenated polymer containing vinyl haloacetate units may be obtained as such or may be made from poly vinyl alcohol by reaction with a haloacetyl halide. Preferably a copolymeric chain is employed, and to support photoreduction we have found a ratio of at least 1 vinyl to every 100 quaternisable haloacetate to be desirable. Quaternised homopolymeric haloacetate may be mixed with poly vinyl alcohol to give a copolymer blend having a ratio of vinyl alcohol to quaternised vinyl haloacetate units such that a polymer according to our invention is formed.

The quaternisation reaction is usually carried out in solution in a refluxing solvent. Convenient solvents are acetonitrile and acetone, dimethyl formamide, alcohols or water. The starting polymer is dissolved in the solvent, which is heated, and the appropriate amine is added. Stirring is generally required to prevent or reduce coagulation of the polymer. After a period, typically ½ to 5 hours the reaction is stopped by cooling or addition of a precipitant for the polymer, and the polymer recovered by filtration from or evaporation of the supporting liquid.

Films of the polymers may be prepared by casting from solution. It is convenient to form films on a thermoplastic film base, e.g. polyester, such as polyethylene terephthalate or cellulose triacetate, or thick self-supporting films can be made by casting onto a suitable surface and peeling off.

The invention is illustrated by the following Examples.

Copolymers: (a) acetone soluble, water and alcohol insoluble copolymer containing 25.7% chlorine which corresponds to a ratio PVCA: PVA units of 5:2. (b) alcohol and acetone insoluble, water soluble polymer. Polyvinyl alcohol 5.4 mole % esterified with chloroacetyl chloride producing a compound containing 3.99% chlorine and having a ratio PVCA:PVA units of 5.4:94.6. (c) methanol soluble, acetone and water insoluble; containing 11.7% chlorine, 19.3 mole % esterfied with chloroacetyl chloride.

EXAMPLE 1

The copolymer (a) (172 gm) was dissolved in acetone (1.5 liter) to produce a pale yellow viscous solution. To 10 mls of the above solution containing 1.145 gms. copolymer (0.0033M based on unit molecular weight of VCA:VA, 2.5:1) was added 1 ml. (10% w/v) water, with vigorous stirring to prevent coagulation of the polymer. The solution was heated gently to reflux on a water-bath and 4,4'-bipyridyl (0.52 gm, 0.003M) added. Reflux conditions and vigorous stirring were maintained for a further hour. A film was then cast by pouring the reaction mixture onto a glass plate and allowing the solvent to evaporate slowly. The film was subjected to further heat treatment by maintaining at a temperature of 90° to 100° C for 1 hour. The dry film was clear, transparent, and pale yellow-brown in colour and became an intense blue colour on exposure to ultraviolet radiation. The film is water and acetone insoluble but is water permeable and swells in acetone; however, the dimensional stability in water appeared to be good. Storage of the irradiated film in the dark caused gradual colour loss, this process being accelerated in humid conditions, but re-exposure of the film (especially dry film) restores the intense blue colour.

The above procedure was repeated varying the amounts of 4,4'-bipyridyl used the system to provide degrees of quaternisation ranging from 100% to 5% (calculated on basis of theoretical assumption that all 4,4'-bipyridyl added to the system is used in quaternisation). All films so prepared are homogeneous and transparent, therebeing no crystallisation indicative of the presence of excess bipyridyl, after the treatment described above.

All films prepared exhibited photo-sensitivity, the intensity of colour developed in films of equal thickness, after a standard exposure time to ultraviolet irradiation (366 nm) being directly related to the degree of quaternisation.

EXAMPLE 2

A solution containing the copolymer (a) (0.01 M) in acetonitrile (100 mls.) was added dropwise to a refluxing salt of N-methyl-4-(4'-pyridyl) pyridinium methosulphate 4.66 gm. (0.045 M) in 75 mls. of methanol. Reflux conditions were maintained for 2 hours and then the volume of reaction mixture was reduced by rotary evaporation. The concentrated solution contained the viscous product was poured into excess acetone when a light grey coloured solid precipitated. The precipitated was collected by filtration, washed with more acetone, and then with ether and finally dried under vacuum at 40° C for 24 hours.

The pale grey solid, 88% yield, decomposes above 220° C. It is soluble in boiling water but sparingly soluble in cold water.

An aqueous solution of the polymer is initially pink in colour but the colouration fades to a pale yellow-brown colour. Films cast from the solution are transparent and pale yellow brown in colour. On exposure to sunlight/ultraviolet irradiation, they became an intense blue colour when dry but purple coloured when stored in humid conditions. The colour fades within 4–6 hours when dry but more rapidly when in the presence of moisture. The image may be restored by re-exposure of dry film.

EXAMPLE 3

The procedure of Example 2 was repeated using the mono cyanophenyl substituted bipyridyl. The produce gives a green colour on exposure to ultraviolet radiation.

EXAMPLE 4

To a solution (50 gms.) containing 4.375 gm. copolymer (b) in water was added 4,4'-bipyridyl (0.3785 gm) and the mixture was heated gently to reflux, on an oil-bath at 110° C, over a period of 15 minutes and maintained under reflux for a further 15 minutes. The solution was then cooled to room temperature and poured onto (a) a glass plate and (b) polyethylene terephthalate film. The films formed by slow evaporation of the solvent (overnight) were further heated at 80° C for periods up to 2 hours. The resulting film is an almost colourless transparent solid which is light-sensitive (ultraviolet or sunlight) producing intense blue images. The image stability is considerably improved over those produced in copolymer (a)/4,4'-bipyridyl film, both under dry and humid conditions, on storage.

The film is water insoluble but water permeable and dimensionally unstable in water.

The dimensional stability of the films could be improved by further cross-linking via the hydroxyl groups using glyoxal or sodium tetraborate.

The chlorine anion could be replaced by fluoride by immersion in concentrated potassium fluoride solution.

EXAMPLE 5

To an aqueous solution of copolymer (b) (50 gms.) containing 4.375 gm. copolymer (dry weight) was added N-(p-cyanophenyl)-4-(4'-pyridyl) pyridinium chloride, (1.4 gm.). The mixture was heated gently to reflux over a period of 20 minutes on an oil-bath at 110° C and maintained under reflux conditions for a further period of 2 hours. On cooling the solution obtained was poured onto glass plates and polyester film as described in previous example.

The film obtained was very light sensitive — giving a dark green image which is very stable, particularly under dry conditions. The film is soluble in hot water and dimensionally unstable in cold water.

Improvement in dimensional stability and ion exchange could be achieved as in Example 4.

EXAMPLE 6

To a solution of copolymer (c) (33 ml.) containing 2 gm. of copolymer (dry weight) was added 4,4'-bipyridyl (1.17 gm.) and the mixture heated to reflux whilst stirred vigorously. Reflux conditions were maintained for 1.5 hours and the solution obtained was poured onto glass plates, polyester film and cellulose triacetate film as described in Example 4. When a cohesive film was obtained, further heat treatment at 80° C for 1 to 4 hours produced a colourless transparent film. The film is light sensitive giving intense blue images when dry, and purple images in moist film, particularly when exposed to ultraviolet light of shorter wavelength than 370 nm.

The stability of the images are intermediate between those produced by reactions of 4,4'-bipyridyl with copolymers (a) and (b) under similar storage conditions. All films produced are heat sensitive and become coloured when heated at temperatures greater than 100° C. The time required to produce visible colourations in the film at temperatures above 100° C varies.

What I claim is:

1. A polymeric composition comprising a copolymer containing (a) vinyl alcohol units and (b) units derived from a vinyl ester of structure

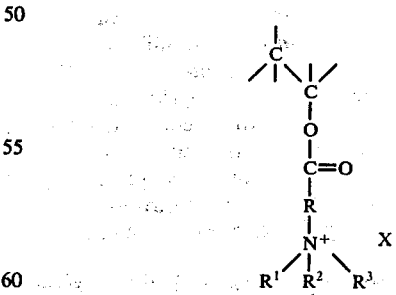

where R is a divalent organic group, $R^1$, $R^2$ and $R^3$ are organic substituents and $X^-$ is an anion, the molar ratio of units (a):(b) being 1 to 100 to 1000 to 1 and units (a) and (b) form at least 80% of the copolymer.

2. A composition according to claim 1 in which $R^1$, $R^2$ or $R^3$ form part of a heterocyclic ring system based on the nitrogen atom.

3. A photosensitive polymeric composition according to claim 1 in which the nitrogen atom of units (b) is part of a heterocyclic ring system linked to a second nitrogen containing heterocyclic ring system and X⁻ is derived from a strong acid.

4. A composition according to claim 3 in which the nitrogen atom forms part of a 2,2′, or a 4,4′-bipyridilium or a 4-(4′-pyridyl) pyridinium heterocyclic system.

5. A cross-linked composition in which cross-linking between a polymer of claim 1 and a second polymer chain is effected via the heterocyclic ring system of claim 3.

6. A method of preparing a polymer according to claim 1 which comprises the step of quaternising vinyl haloacetate units in a a copolymer containing vinyl alcohol and vinyl haloacetate units.

7. A method of obtaining a polymeric film by coating a solution of the polymeric composition of claim 1 on to a support and optionally removing hardened polymer film from the said support.

8. A radiation sensitive film comprising the polymer composition of claim 3.

9. A polymeric composition according to claim 4 wherein said copolymer contains vinyl alcohol units and vinyl chloroacetate units, the latter having been quaternized with 4,4′-bipyridyl.

10. A radiation sensitive article comprising copolymer composition containing (a) vinyl alcohol units and (b) units derived from a vinyl ester of the structure

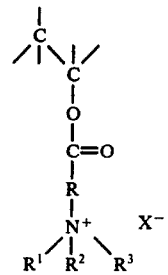

where R is a divalent organic group, $R^1$, $R^2$ and $R^3$ are organic substituents which form part of a heterocyclic ring system linked to a second nitrogen containing heterocyclic ring system, and X⁻ is derived from a strong acid, the molar ratio of units (a):(b) being 1 to 100 to 1000 to 1 and the units (a) and (b) form at least 80% of the copolymer.

11. An article according to claim 10 in which the nitrogen atom forms part of a 2,2′-or a 4,4′-bipyridilium, a 7,7′-diazapyrenium, a 2,2′-or a 4,4′-biquinolinum, a 1,2-dipyridinium ethylene or a 4-(4′pyridyl) pyridinium heterocyclic system.

* * * * *